United States Patent
Nguyen

(10) Patent No.: US 6,909,927 B2
(45) Date of Patent: Jun. 21, 2005

(54) APPARATUS AND METHOD FOR MONITORING MANUFACTURING STATUS

(75) Inventor: Tri Minh Nguyen, Tustin, CA (US)

(73) Assignee: Ricoh Electronics, Inc., Tustin, CA (US)

( * ) Notice: Subject to any disclaimer, the term of this patent is extended or adjusted under 35 U.S.C. 154(b) by 116 days.

(21) Appl. No.: 09/827,507

(22) Filed: Apr. 6, 2001

(65) Prior Publication Data

US 2002/0147518 A1 Oct. 10, 2002

(51) Int. Cl.⁷ ............................................. G06F 19/00
(52) U.S. Cl. ..................................... 700/110; 700/115
(58) Field of Search .................. 700/108–110, 115–116

(56) References Cited

U.S. PATENT DOCUMENTS

| | | | | |
|---|---|---|---|---|
| 4,953,277 A | * | 9/1990 | Crispin et al. ........... 29/407.05 |
| 5,231,585 A | * | 7/1993 | Kobayashi et al. ........... 700/96 |
| 5,353,230 A | * | 10/1994 | Maejima et al. ............ 700/115 |
| 5,396,432 A | * | 3/1995 | Saka et al. .................. 700/111 |
| 5,673,194 A | * | 9/1997 | Cipelletti et al. ........... 700/115 |
| 5,726,920 A | * | 3/1998 | Chen et al. .................. 702/120 |
| 5,751,581 A | * | 5/1998 | Tau et al. .................... 700/115 |
| 5,978,751 A | * | 11/1999 | Pence et al. ................. 702/179 |
| 6,055,463 A | * | 4/2000 | Cheong et al. ............. 700/115 |
| 6,148,245 A | * | 11/2000 | Lynch et al. ................ 700/223 |
| 6,236,901 B1 | * | 5/2001 | Goss ........................... 700/95 |
| 6,246,919 B1 | * | 6/2001 | Hassel ........................ 700/115 |
| 6,256,549 B1 | * | 7/2001 | Romero et al. ............. 700/116 |
| 6,366,824 B1 | * | 4/2002 | Nair et al. ................... 700/121 |
| 6,381,509 B1 | * | 4/2002 | Thiel et al. ................. 700/115 |
| 6,507,765 B1 | * | 1/2003 | Hopkins et al. .............. 700/95 |

* cited by examiner

*Primary Examiner*—Leo Picard
*Assistant Examiner*—Ryan Jarrett
(74) *Attorney, Agent, or Firm*—Hogan & Hartson, LLP

(57) ABSTRACT

A method of monitoring the manufacturing status of a machine comprises the steps of assigning a machine identifier to a machine comprised of one or more components, the machine to be manufactured at one or more production stations, wherein each one or more production stations is assigned a production station identifier, inputting the machine identifier into at least one memory of a first computer, inputting a unit control identifier for each one or more component, wherein the unit control identifier is linked to the production station identifier where the unit control identifier is input, inputting defect information for each one or more component into the memory at an inspecting station, wherein each inspecting station is assigned an inspecting station identifier, so that the component information and the unit control identifier are linked to the inspecting station where the defect information is input, linking the stored unit control identifier, and the stored machine number; and outputting defect information.

21 Claims, 13 Drawing Sheets

FIG. 3A

FIG. 4A  Traveler – Machine Record

| A229-17  120V-60Hz | | | Ricoh  Aficio650 |
|---|---|---|---|
| MACHINE NUMBER | MACHINE Serial # | | BAR CODE NUMBER |
| 2299110042 | | | A 22 917 00 00 00 00 0000 00 y  — 230 |
| AU-01 Scanner BICU PCB Serial #  Duplex Unit No.  Scanner Unit No. | | Machine Input Date/Time  11/1/99  11 27:15 AM | Machine Output Date/Time |
| AU-02 Fusing Unit No.  Controller Unit No.  PCU Unit No. | | ARDF Serial No. | Beam Pitch  0 8 8 7 3 6 0 — 240 |
| AU-03 Tandem LCT User No.  Operation Panel PCB Serial No. | | PCI Nos.  Upper  Lower  Back / Front | Beam Power  9 1 3 0 7 8 — 250 |
| AQ-01 I/O PCB Serial #  Power Supply PCB Serial #  Paper Bank PCB Serial #  Ground Test  Insulation Test | 49040107  49034179  49047500  Beep (yes) (no)  10 MOhms or More (yes) (no) | Units | Slave Developer Tank Voltage #  0 0 7 1 1 1 J — 260 |
| AQ-02 Leakage Test  Total Wattage | 3.5 mA Max (yes) (no)  1300~1500 Watts  1475 Watts | Operation Panel PCB Serial #  Paper Feed Unit No.  Exit Unit No. | |
| AQ-03 Total Counter | 0000000001~0000010 | | |
| AQ-04 High Voltage Test  Ground Test | 1.25 KV for 2 seconds (yes) (no)  0.1 Ohm or Less (yes) (no) | | |

| AU-01 | AU-02 | AU-03 | AQ-01 | AQ-02 | AQ-03 | AQ-04 | AQ-05 | AQ-06 | AQ-07 | AQ-08 | AQ-09 | AQ-10 | QA Defect | | | |
|---|---|---|---|---|---|---|---|---|---|---|---|---|---|---|---|---|
| | | | | | | | | | | | | | Defect | Repair | TTR | QA |
| L O | L O C | L O | 02555 | 00059 | 92684 | | | | | | | | | | | |
| | | | | | | | | | | | | | | | | QA |
| Note | | | | | | | | | | | | | | | | |

| 270 — STA | DEFECT | REPAIR | OFF LINE | | TTR | INSP |
|---|---|---|---|---|---|---|
| | | | OUT | IN | | |
| | | | OUT | IN | | |
| | | | OUT | IN | | |
| | | | OUT | IN | | |
| | | | OUT | IN | | |
| | | | OUT | IN | | |

Current Data (From Last Working Day 4:00 PM to Today 4:00 PM)

QC Stations

| | Def | Insp | Rate | | | | | Q'ty | Rate | |
|---|---|---|---|---|---|---|---|---|---|---|
| AQ-01 | 14 | 88 | 0.159 | | X | | Prod Main | 22 | 0.262 | |
| AQ-02 | 6 | 87 | 0.069 | | | | Prod Sub | 6 | 0.072 | |
| AQ-03 | 6 | 85 | 0.071 | | All Models | | J-7 | 4 | 0.048 | |
| AQ-04 | 0 | 85 | 0 | | Total Defect 44 — 395 | | Loc | 0 | 0 | |
| AQ-05 | 2 | 83 | 0.024 | | NIC Defect 1 — 390 | | PCB | 1 | 0.012 | |
| AQ-06 | 0 | 86 | 0 | | Insp.Q'ty 84 — 380 | | Eng | 0 | 0 | |
| AQ-07 | 2 | 85 | 0.024 | | Failer Rate 0.513 — 370 | | QC | 0 | 0 | |
| AQ-08 | 3 | 84 | 0.036 | | | | No Info | 0 | 0 | |
| AQ-09 | 1 | 84 | 0.012 | | Refresh to Latest Data | | Others | 2 | 0.024 | |
| AQ-10 | 1 | 84 | 0.012 | | | | Under Rework | 7 | 0.084 | |
| AU-01 | 2 | 88 | 0.023 | | | | | 340 | 350 | 360 |
| AU-02 | 3 | 76 | 0.04 | | Return to Main Screen | | | | | |
| AU-03 | 3 | 75 | 0.04 | | | | | | | |
| | 300 | 310 | 320 | 330 | | | | | | |

FIG. 5

| Machine No. | Insp St | Defect | Repair | Respons | Prod | Defect Time |
|---|---|---|---|---|---|---|
| 9350050200 | AQ-01 | Discn cn(2)pin rear mach Fan | Connected | PROD | AE LINE | 5/30/00 7:55:36AM |
| 9350050168 | AQ-01 | Discn cn(273): Paper bank board | Connected the connector | PROD | AE-07 | 5/25/00 4:53:37PM |
| 9350050177 | AQ-01 | Harness out of the saddle rear side mach base | Put into the clamp | PROD | AE-02 | 5/25/00 4:03:44PM |
| 9350050254 | AQ-01 | Incomplete locked Ferrite Cote | Assy closed (ferrite) | PROD | AC LINE | 5/30/00 2:01:58PM |
| 9350050238 | AQ-01 | Loose rivet: paper bank frame | Retighten | PROD | AW LINE | 5/30/00 12:50:25PM |
| 9350050220 | AQ-01 | M/M Duct fan | Remounted | PROD | AC-05 | 5/30/00 10:01:01AM |
| 9370050011 | AQ-01 | M/S ferrite power cord | | | | 5/30/00 3:32:19PM |
| 9350050252 | AQ-01 | M/S screw, Duct fan | | | | 5/30/00 3:24:30PM |
| 9350050252 | AQ-01 | M/S screw, Duct fan(1) | Installed (SCREW) | PROD | AC-01 | 5/30/00 1:25:52PM |
| 9350050202 | AQ-01 | M/S screw, Duct fan brkt (1) | Installed the screws | PROD | AE-11 | 5/30/00 8:11:51AM |
| 9350050248 | AQ-01 | M/S toner recycle brkt. Screws on rear side | PTA #9 error (installed the saddles) | PROD | AE-02 | 5/30/00 1:01:58PM |
| 9350050243 | AQ-01 | Mis-routed black han. Power supply | Asssy put correct position(harness) | PROD | AE-LINE | 5/30/00 12:37:00PM |
| 9350050177 | AQ-01 | No display: operation panel | Replace BICU replaced | J-7 | | 5/30/00 4:04:34PM |
| 9350050233 | AQ-01 | No display: operation panel | Replace scanner PCB | J-7 | | 5/30/00 11:12:52AM |
| 9350050209 | AQ-01 | No power: machine | BICU CN-301 disconnect(connected)En | PROD | AE-10 | 5/30/00 9:24:40AM |
| 9350050205 | AQ-01 | SC 366 light stay on | Replaced BICU pcb | J-7 | | 5/30/00 8:24:02AM |

| | | | | | |
|---|---|---|---|---|---|
| 9350050252 | H4805300240 | AQ-01 | MS Screw Doct | 05-30-00 3:24PM | 05-30-00 8:57 AM |
| 9350050252 | H4805300240 | AQ-09 | Out prime temp scanner harness | 05-30-00 3:23PM | 05-30-00 8:57 AM |

Record [◁][◀] 8165 [△][▷] or 8165

FIG. 6

| Date | Input 600 | 610 | 620 Total | QC Output 630 | 640 | 650 Total | Packing Output 660 | 670 | 680 Total | Work in Progress 690 | 700 | 710 Total |
|---|---|---|---|---|---|---|---|---|---|---|---|---|
| 5/25/00 | 95 | | 95 | 93 | | 93 | 101 | | 101 | 82 | 0 | 82 |
| 5/24/00 | 95 | | 95 | 100 | | 100 | 102 | | 102 | 88 | 0 | 88 |
| 5/23/00 | 96 | | 96 | 105 | | 105 | 115 | | 115 | 95 | 0 | 95 |
| 5/22/00 | 82 | | 82 | 78 | | 78 | 57 | | 57 | 114 | 0 | 114 |
| 5/18/00 | 94 | | 94 | 85 | | 85 | 86 | | 86 | 89 | 0 | 89 |
| 5/17/00 | 91 | | 91 | 87 | | 87 | 115 | | 115 | 81 | 0 | 81 |
| 5/16/00 | 94 | | 94 | 90 | | 90 | 60 | | 60 | 105 | 0 | 105 |
| 5/15/00 | 86 | | 86 | 90 | | 90 | 94 | | 94 | 71 | 0 | 71 |
| 5/11/00 | 93 | | 93 | 85 | 68 | 85 | 82 | 5 | 87 | 79 | 0 | 79 |
| 5/10/00 | 66 | 7 | 73 | 7 | 85 | 75 | 1 | 74 | 75 | 68 | 5 | 73 |
| 5/9/00 | | 91 | 91 | | 85 | 85 | | 84 | 84 | 3 | 72 | 75 |
| 5/8/00 | | 73 | 73 | | 70 | 70 | | 81 | 81 | 3 | 65 | 68 |
| 5/5/00 | 62 | 62 | 62 | | 64 | 64 | 1 | 63 | 64 | 3 | 73 | 76 |

FIG. 8

APPARATUS AND METHOD FOR MONITORING MANUFACTURING STATUS

BACKGROUND OF THE INVENTION

The present invention generally relates to an apparatus and method for monitoring manufacturing status. The present invention relates more specifically to an apparatus and method for monitoring the manufacturing status of a machine that is comprised of one or more components, where the components are incorporated into the machine at one or more production stations.

Commonly, a machine to be manufactured is comprised of one or more components. Each component must be incorporated into the machine. These components are incorporated into the machine at a production station. Prior to incorporation, a component is generally tested to determine whether the component meets pre-determined standards for operation, function, and or use. If a component meets all applicable pre-determined standards, the component is then incorporated into the machine.

Prior art methods for monitoring manufacture status have included the manual entry of the information on a "traveler." A traveler is a written record of the manufacturing history of the machine. Information regarding the manufacturing history is manually entered on the traveler at each production and/or inspection station. Generally, all travelers for the machines that have been assembled are collected each relevant business cycle, for instance daily.

Prior art methods for tracking manufacturing status possess serious deficiencies. For instance, requiring employees to hand write entries onto a traveler is time consuming and introduces the possibility of error. In addition, employee or inspector handwriting can be difficult to read. Second, where a defect is detected, management may be required to go directly to an individual inspection station to find out what the defect is and how to correct it. Moreover, because travelers are not collected or entered until the end of the day or other business cycle, production and defect information, including total units manufactured and the failure rate are generally only available at the end of the cycle (for instance the end of the day) and only after manual calculation.

SUMMARY OF THE INVENTION

The present invention is a computerized method of monitoring the manufacturing status and history of a machine that is comprised of one or more components, wherein each component is to be incorporated at one or more production stations and is to be tested at one or more inspection stations.

The present invention includes assigning a machine identifier to each production unit. Each production station where a component is to be incorporated into the machine is assigned a production station identifier. Next, a unit control identifier is assigned to each one or more components wherein the unit control identifier is linked to the production station identifier where the unit control identifier is input. Defect information for each one or more component is input into the memory at an inspecting station that is assigned an inspecting station identifier, and the defect information and the unit control identifier are linked to the inspecting station where the defect information is input. The stored unit control identifier and the stored machine number are then linked. Finally, defect information is output, including at least either the machine number and said unit control number, wherein the machine history in manufacturing is traced later.

It is an object of the present invention to provide more accurate and detailed information on the manufacturing status of production units. It is also an object of the present invention to track the manufacturing status of production units during manufacture in "real time." It is also an object of the present invention to eliminate the substantial cost of requiring production managers to travel within production facility so that corrective action can be readily assigned to a responsible business function in real time without the necessity for traveling to the production station. It is also an object of the present invention to provide real time component information, such as failure rates.

These and other aspects of the invention are herein described in particularized detail with reference to the accompanying Figures, the Figures being representative of but some of the various ways in which the principles and concepts of the invention may be carried out.

BRIEF DESCRIPTION OF THE DRAWINGS

FIG. 5 is an example of a screen display showing a real time failure rate report generated by the manufacturing monitoring system of the present invention;

FIG. 6 is an example of screen displays showing a defect information report generated by the manufacturing monitoring system of the present invention;

FIG. 8 is an example of a screen display a Work in Process report generated by the manufacturing monitoring system of the present invention;

DETAILED DESCRIPTION OF THE INVENTION

Figure 1:
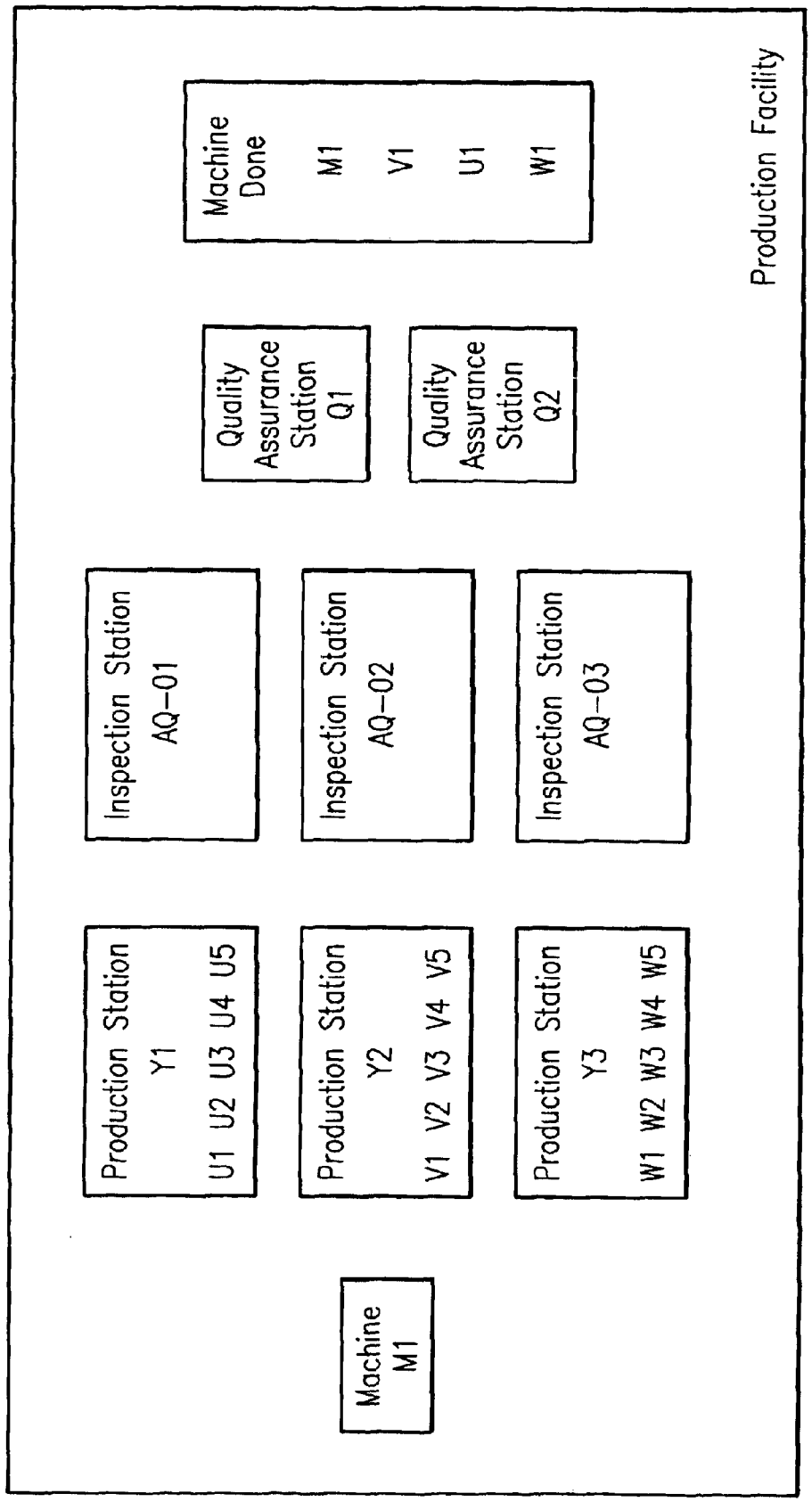
FIG. 1 is a schematic diagram of the basic operational components of one embodiment of the manufacturing monitoring system of the present invention.

FIG. 1 schematically illustrates one application of a basic aspect of the manufacturing monitoring system of the present invention, within the confines of a production facility. A production facility may be a factory, warehouse sub-assembly plant, distribution center, or any other place where production units are assembled. As used herein, the term "system" refers to the described equipment, the hardware and software used to carry out the described methods of the manufacturing monitoring system, and to the apparatus and equipment used to operate the system, including computer hardware and software, peripheral data input devices, monitors, and communications devices. In the basic system shown in FIG. 1, the system accumulates, stores and disseminates information on a production unit's manufacturing status, i.e. which components have been incorporated into the production unit, status of those incorporated and operation and/or function of the component added. As further described herein, important time sensitive data on manufacturing status which the system uses is collected at production stations, inspection stations and quality assurance stations.

As further shown in FIG. 1, each production station is assigned a unique production station identifier such as Y1, Y2, etc. Each of the inspection stations is uniquely designated such as AQ-01, AQ-02, etc. Each quality assurance station is also assigned a unique quality assurance station identifier such as Q1, Q2, etc. An inspection station is defined as a station whereat production units are inspected on the production line while the products are still being assembled, and 100% of the machines are inspected. A quality assurance station as a station where production units are inspected only when the machine has been completely assembled and machines are randomly selected based on the preset standard (not all machines will have quality assurance inspection). Each production unit, M, of the machine and one or more components thereof, U, V, W, etc. is also uniquely identified by a code or number. In the present invention, this combination of codes is used to track and monitor the manufacture of production units. For example, in the printer industry, each printer is uniquely identified by a machine code which may correspond to the name of the producer company. Each of the printers is assigned an individual code (usually alpha numeric) which is combined with the producer code to identify every produced printer. This combination of codes is used to track and monitor the printers. The system is readily adaptable to any number or combination of production station and inspections stations. Coded identification of all machines and components thereof provides control over the manufacturing process, and means for recording information with respect thereto at a facility, and at individual production and inspection stations. The system provides the basic framework for compiling detailed data on the manufacturing process which can be used by a facility, its employees, engineers and managers to optimize manufacturing and quality assurance functions. Defect information regarding the production unit, or individual components thereof, may be entered into a computer and linked to the production unit, or one or more production stations, one or more inspection stations, or quality assurance stations through the pertinent identifiers in the MMS database.

Figure 2:
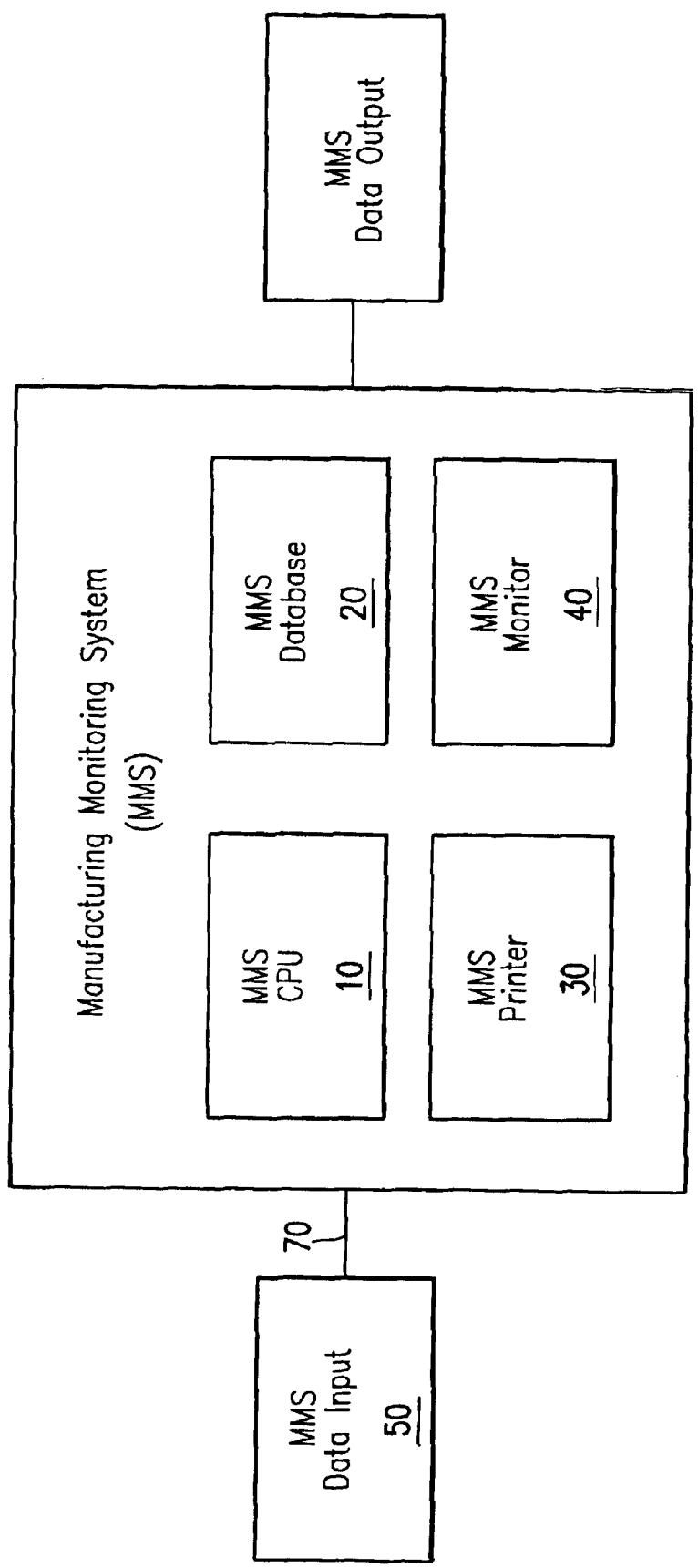
FIG. 2 is a schematic diagram of the basic hardware components of the present invention including related databases, management information systems and input and communications devices

FIG. 2 schematically illustrates an integrated system in which the computer system of the manufacturing monitoring system is combined with a computer system at a production facility. A manufacturing monitoring system (MMS) includes a central processing unit (10) for receiving and processing manufacturing related data, one or more manufacturing data input terminals (50) which may be either locally or remotely located from the MMS, an MMS monitor (40), communications links to remote computing systems and/or data receiving modules (70), one or more printers (30) for producing hard copy reports of manufacturing data acquired and processed by the MMS, and an MMS database (20). In one possible hardware arrangement of the system, one or more manufacturing data input terminals (50) and monitors (40) may be located at a production station for input of data acquired at the production stations into the MMS. Many different types of data input devices can be used in connection with the system to input data on production units. A human operator located at, for example, the production station can input the data manually into a terminal connected to the Manufacturing Monitoring System as each component is readied for incorporation into a production unit. Preferably, optical scanners or RF data communications devices such as manufactured by Texas Instruments and Teklogix, or bar code readers such as the Telxon PTC 921 and PTC 912DS may be used to input the coded information. Other input methods and devices include hand held radios operated by employees at the production station to communicate data to the MMS System.

Figure 3:
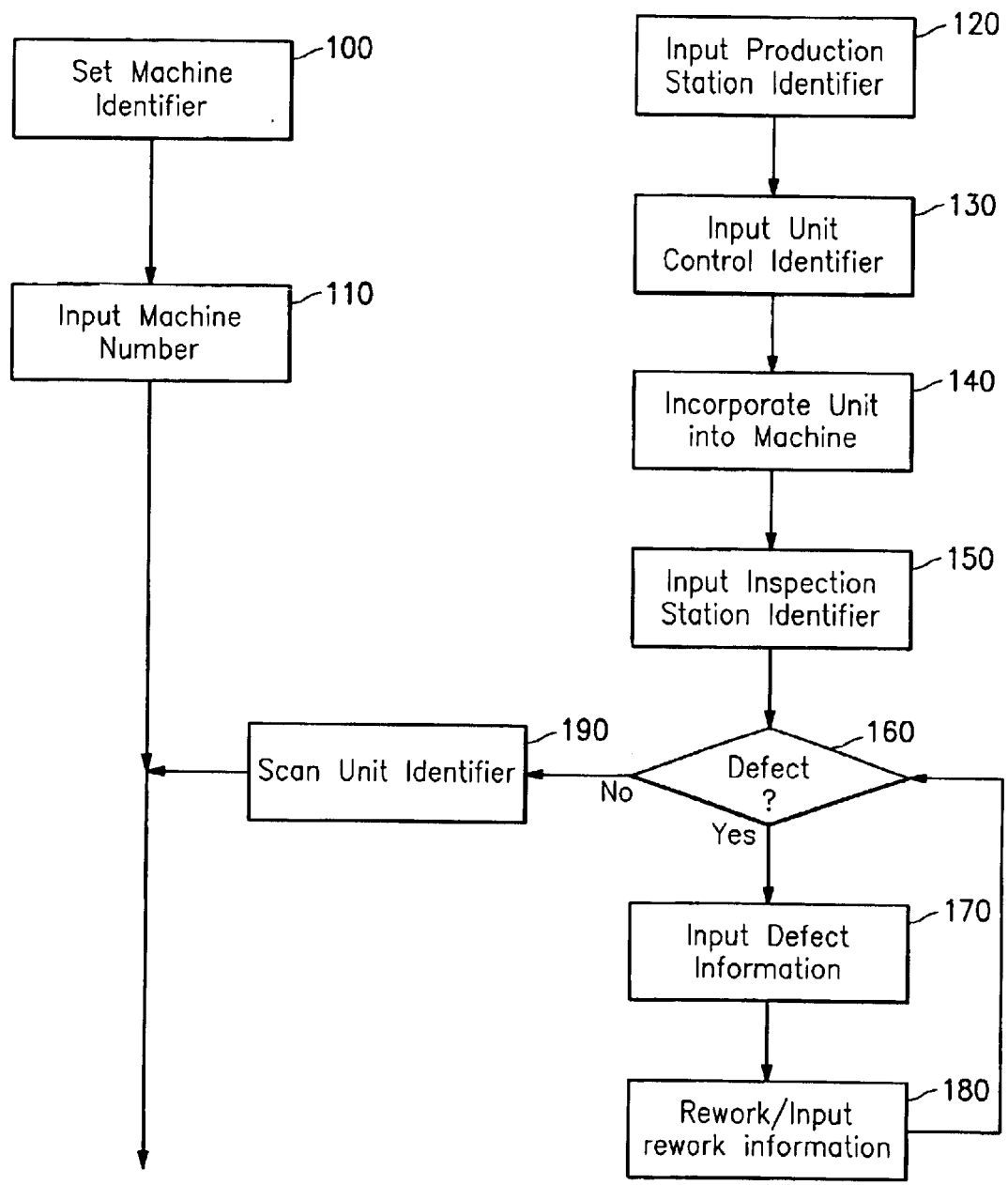
FIG. 3 is a schematic diagram illustrating the method of the present invention for a single production unit.

FIG. 3 is a detailed flow chart embodying the present invention as it relates to the manufacture of a single production unit. A machine identifier is assigned to each production unit of the machine whose manufacture is to be monitored (Step 100). The machine identifier uniquely identifies the production unit. Once a machine identifier is assigned to the production unit, the machine identifier is entered into the memory of at least one computer (step 110) and into the MMS database. Preferably, the machine identifier is scannable by a commercially available scanning system. Most preferably, the machine identifier is a bar code that is assigned on a monthly manufacturing schedule and the data is input into the memory of the computer by using a bar code reader.

The machine is then readied for incorporation of a first component. Components are readied for incorporation into the production unit at a production station. Each production station is assigned a production station identifier. The production station identifier uniquely identifies the production station. Preferably, the production station identifier is a machine-readable format. Each production station identifier is added to the memory of the computer and into the MMS database (Step 120).

Prior to incorporation into the production unit, each component is assigned a unit control identifier. The unit control identifier uniquely identifies the component that is added to the machine. In general, the unit control identifier is in a machine-readable format. Most preferably, the unit control identifier is a bar code that may be scanned into memory. The unit control identifier is entered into the memory of at least one computer (Step 130) such that the unit control identifier is linked to the production station identifier at which the unit control identifier is input. Other information may likewise be linked to the production station identifier. For example employee information or other production identifiers may be linked to the production station identifiers.

Prior to incorporation, the component is tested at at least one inspection station. The inspection station is assigned an inspection station identifier. Each inspection station and the product station may be the same station. Furthermore, the inspection station identifier and the production station identifier may be the same. The inspecting station identifier uniquely identifies the inspecting station. The inspection identifier should be in a machine-readable format. The inspection station identifier is input into the machine (Step 150).

The inspecting station identifies defect information relating to the component (Step 160). Defect information means any information relating to the structure or operation of the component, and may include information that the component is utterly free of defects. Other types of defect information include: component part number, component serial number, component data setting information, defect time, method of repair and the defect responsible section. Where no defect is detected, the inspection station inputs the unit control identifier into the memory of the computer (Step 190), and the unit control identifier and stored machine identifier are linked to the inspection station identifier in the MMS database. Where a defect is detected, defect information for each one or more component is input into the memory of the computer at the inspecting station (Step 170) such that the defect information and the unit control identifier are linked to the inspection station identifier for the inspection station where the defect information is input. Preferably, the method includes inputting the time when said defect phenomena occurred. Finally, the stored unit control identifier and the stored machine identifier are linked in the computer memory.

Where the defect information indicates that corrective measure must be taken, the method disclosed herein preferably includes providing corrective information for resolving the defect (Step 180). The process of identifying defects (Step 160), inputting defect information (Step 170), and re-working or inputting re-work information (Step 180) is continued until no further defects are identified.

Figure 3A:
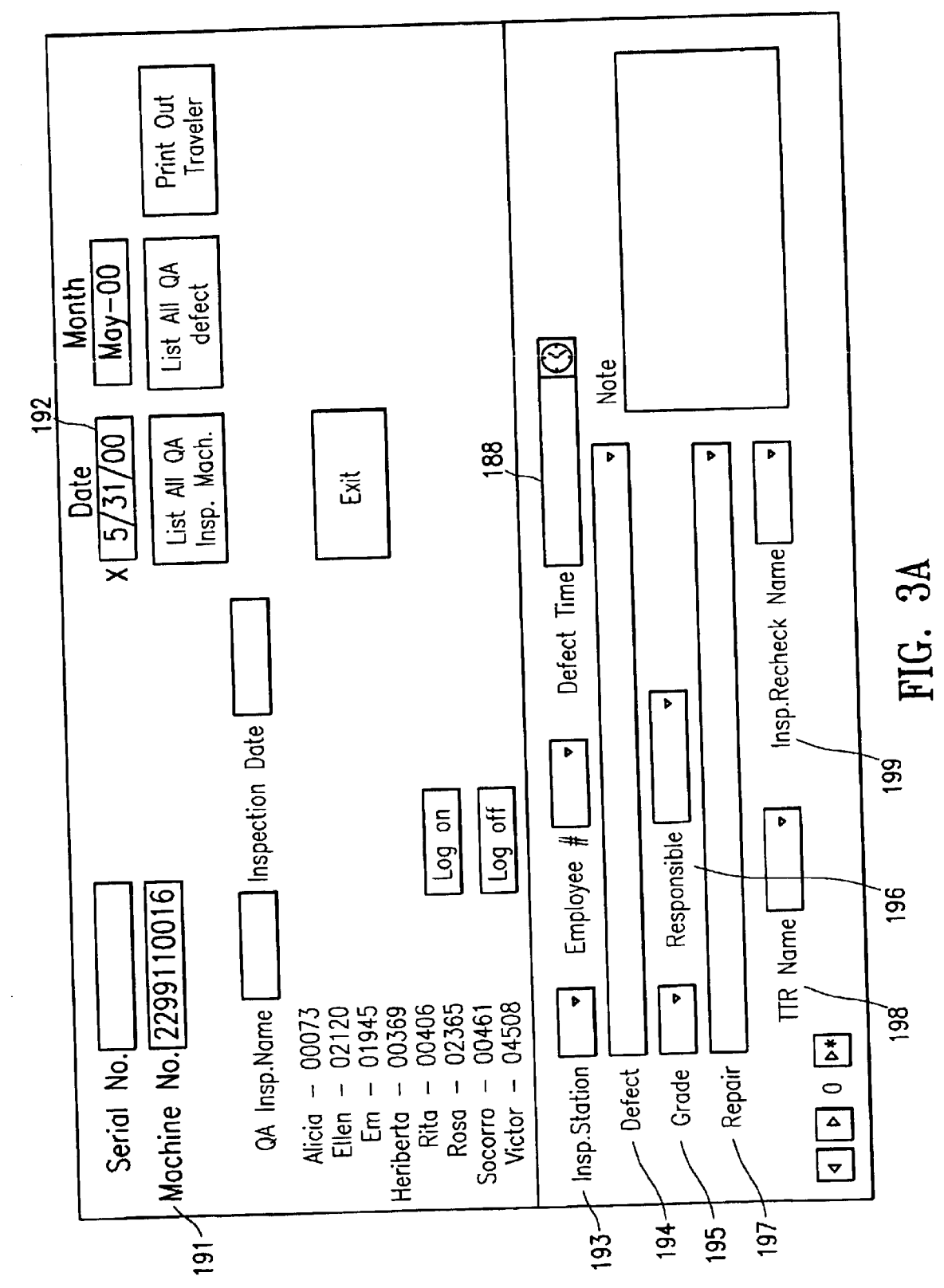

FIG. 3A is representative of a type of screen display which may be generated by the MMS computer program for input and display of defect information and re-work information at an MMS monitor. The defect information is linked to the machine identifier (191) and the date the defect is identified is entered (192). At the inspection station, the inspection station identifier is input (193) together with the defect identified (194). The defect information is available to any employee, manager, or engineer with access to an MMS monitor. The method preferably includes inputting a business function identifier (196) into the memory, wherein the business function identifier identifies the party responsible for resolving the at least one defect phenomena. Preferably, the method further includes inputting a resolving method (197) for the at least one defect phenomena into the memory. It is common that certain type of defects are common amongst the production units, and as such, the methods for resolving are commonly known and the user may generate a list of types of resolving methods. Thus, preferably, the resolving method may be selected from a list of pre-stored resolving methods (197). Where the defect information indicates that a component is to be replaced, the new component is assigned a new unit control identifier corresponding to the new component, In order to maximize efficiency, it may be advantageous to refrain from immediate repair of the discovered defect. Thus, preferably, the selected resolving method may be stored in the memory for later use. Preferably, the system includes a means for selecting designating stations among the responsible business functions to send message through said network to said selected responsible business functions. Preferably, the system further comprises selecting at least one of said business functions to see messages that are sent from said selected stations.

As discussed above, FIG. 3 shows one embodiment of the present invention as it relates to the incorporation of a single component a single production unit. However, the method disclosed in FIG. 3 provides the framework for construction of a production unit having any number of components at any number of production stations, Inspection stations and/or quality insurance stations. Where more than one component is to be added, the method of FIG. 3 can be modified by repeating Steps 120 to 190 for each component at each production station and inspecting station. Inspection of any completed production unit or subsystem thereof may be achieved by repeating steps 150 to 190 as shown in FIG. 3. Upon completion of manufacture of a production unit, the information entered into the MMS database regarding the production unit is retained in the memory of the MMS system.

After one or more components is added to the production unit at the one or more production stations, the production station and/or inspection station produces a next production unit consistent with the steps of the present invention. By entering production, quality and defect information for each production unit and retaining information on completed production units, the MMS system of the present invention generates and compiles detailed manufacturing information.

At minimum, the method includes outputting at least some defect information, which includes at least one of the machine identifier and the unit control number, so that the machine history during manufacture can be traced later. The manufacturing history for each production unit may be output routinely on fixed time schedule. Preferably, the output is printed out daily. Preferably, the information in the memory can be retrieved and/or outputted by using at least one of said machine number, said unit control number, said production station number and said inspecting station number. Preferably, the output is displayed on a second computer that is connected to the first computer through a network. Even more preferably, the output can be accessed in real time.

Figure 4:
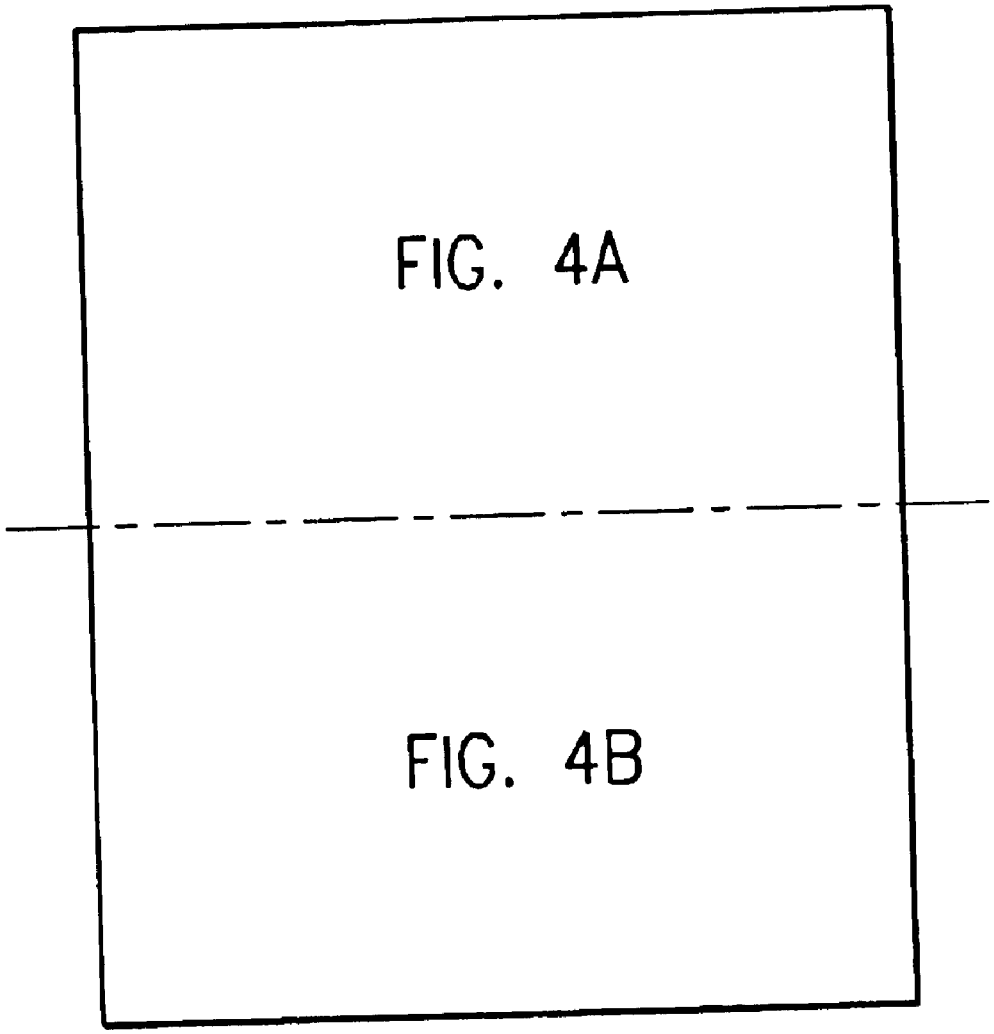
FIG. 4 is an example of a manufacturing status report generated by the manufacturing monitoring system of the present invention for a single production unit.

By compiling production information for a production unit with regard to each component, production station and inspection station, the MMS system can generate a manufacturing history Report, or a Machine Traveler Record as shown in FIG. 4. FIG. 4 is a Machine Record Traveler showing the machine identifier (200), its bar code (230), the unit control identifiers for each component (240, 250, 260), the production stations (e.g., 210) and inspection stations (220) where the machine was produced and inspected. The Machine Traveler Record may be output at any stage of the production process so as to give a real time report of the production status at any time during production.

Preferably, the output process includes counting the number of times of a defect is detected and the number of production; and automatically generating defect information and outputting defect information based on the total number of machines that have been assembled over a time period determined by the user. Preferably this method includes calculating statistics which relates to said defect automatically and outputting said calculated statistics. More preferably, the defect information includes at least one of defect rates and rates without defect.

As shown in FIG. 6, the MMS system generates a current defect report consisting of the defect information for each machine unit. The report includes the machine identifier (400), the inspection station where the defect was identified (410), the defect information (420) the repair indicated for the defect (430), the Responsible business function (440), the production station (450) and the time the defect was identified (460). This report is important because it permits an employee, manager or engineer to identify and therefore correct recurring defects in real time. It is also important because it will assist and identify the possible source of the defect through relating information from the defect.

Further, as shown in FIG. 5 the MMS system generates a defect rate report. The report includes a listing of each inspection station (300), the number of defects identified at each production unit (310), the total number of units inspected (320), the defect rate at each inspection station (330), the total number of defects (400), failure rate (400), the category and number of each category of defect detected (340, 350) and the associated failure rate (360). This report is important because it permits an employee, manager or engineer to identify "abnormal" defect rates. It is also important because it will identify where the most defects are located at, or where the most defects fall into what category, so each responsible business function will be able to take any necessary action.

Figure 7:
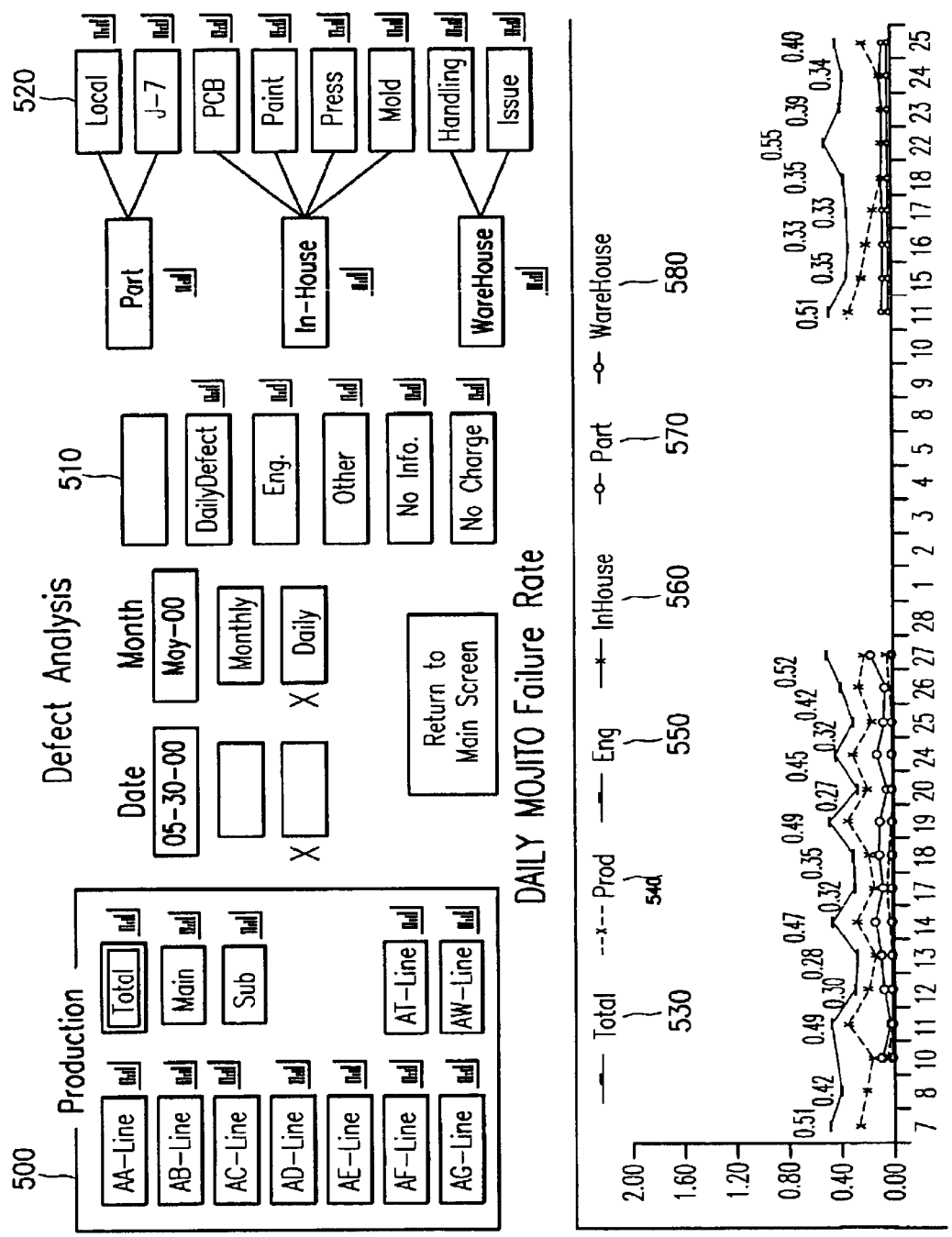
FIG. 7 is an example of a screen display showing a Defect Analysis Report generated by the manufacturing monitoring system of the present invention.

As shown in FIG. 7, the MMS provides for graphical defect rate analysis over a pre-determined time period. The MMS can generate a total daily defect rate (530) and identify defect rates for specific types of defects (540, 550, 560, 570 and 580). Therefore, the MMS system makes it possible to swiftly and accurately identify problems in production and quality assurance by identifying high defect of particular types of defects Preferably, the method includes a method for generating the number of machines whose manufacture is in process. Work-in process information may be obtained by first inputting a second machine Identifier into said memory by scanning the bar code, wherein the second machine identifier is assigned to each machine and is different from the first machine identifier. The work in process quantity can be identified by counting an input quantity at the first production station based on the stored first machine identifier and an output quantity from the final production station based on the stored second machine identifier and then generating a work-in-process number that is quantity of machines related to the at least input quantity and the output quantity. By maintaining input and output information, the MMS can generate a work in process report as shown in FIG. 8. FIG. 8 shows the input quantity for each model of production unit by each working day end (600,610) and the total of all machines quantity have been inputted by each working day end (620), total machines output quantity at the last inspection station (630, 640, 650), the total machines quantity have been completely finished and packed (660, 670, 680). The work in process will be calculated based on the previous day work in process quantity plus the total machine inputted quantity for the day, less total machines completely finished and packed quantity (690, 700, 710).

Figure 9:
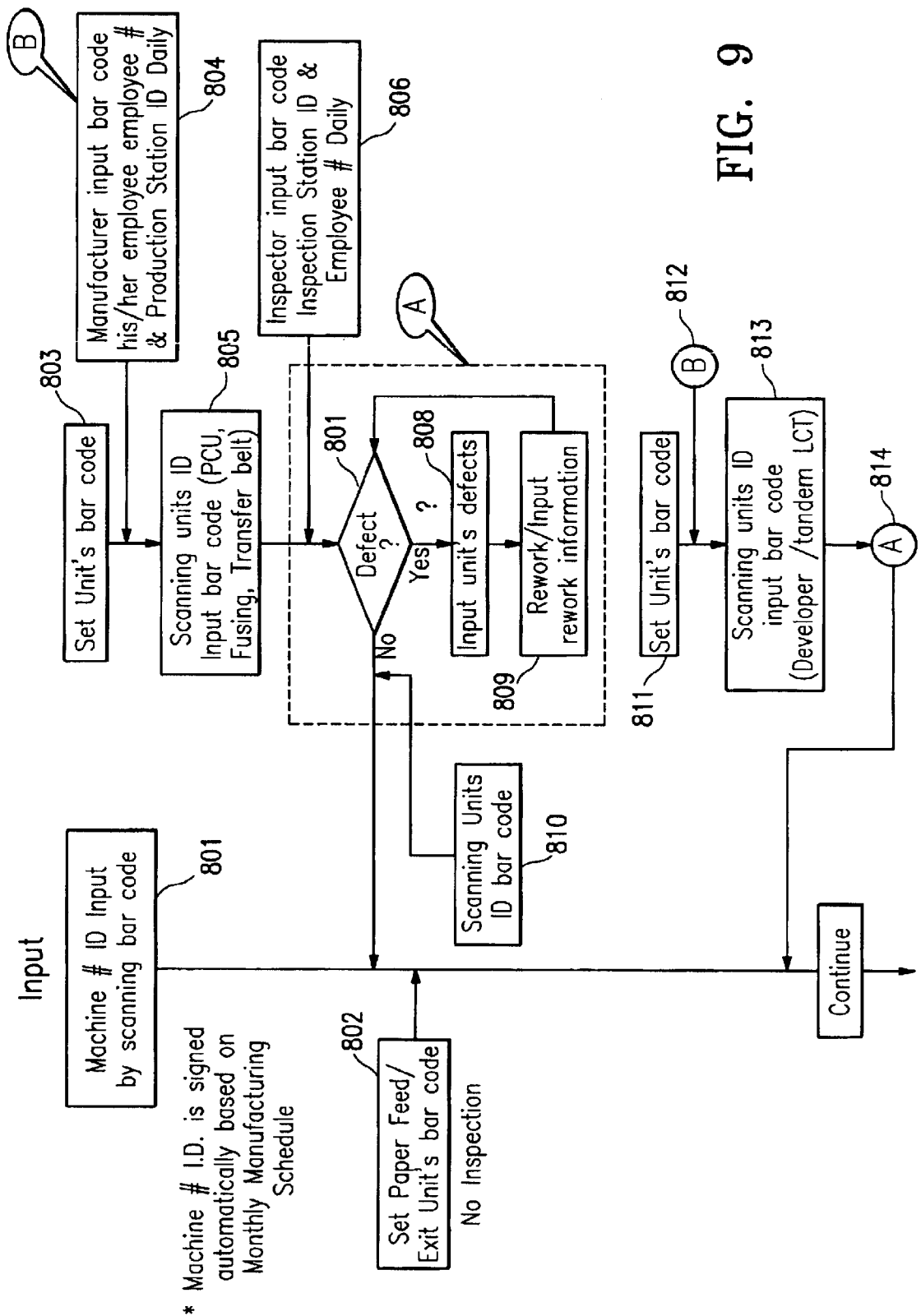
FIG. 9 and FIG. 9A is a flow diagram showing the application of the present invention to the manufacture of a printer device.
Figure 9A:
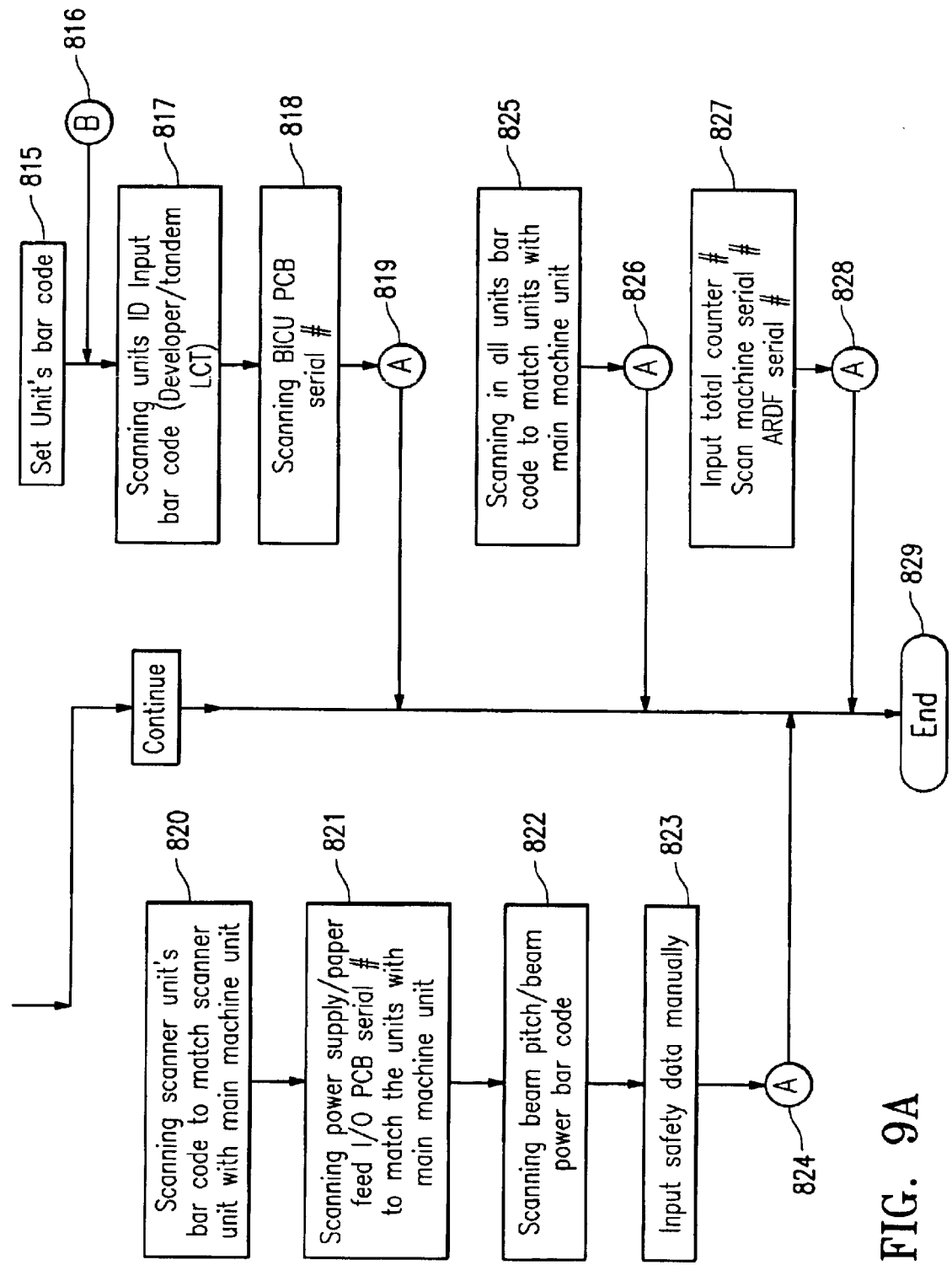

FIG. 9 shows the manufacturing flow of one embodiment of the present invention as it applies to the manufacture of printers. Machine identifiers, consisting of a machine number and associated bar code are assigned to the production units of the printers automatically based on a monthly manufacturing schedule. The machine identifier is input into the memory of the MMS by scanning the production unit's bar code in Step 801. In Step 802, The unit control identifier of the Paper Feed/Exit Unit is assigned in the form of a bar code, which is scanned and entered into the memory of the MMS. The production unit is then transferred to a first production station for incorporation of the PCU, Fusing, transfer belt. The unit control identifiers for the PCU, Fusing, Tranfer Belts ready for incorporation into production units are set in Step 803. The production station identifier for the production station responsible for incorporating the PCU, Fusing, Transfer Belts is manually input into the memory of the MMS System by an employee working at the production station on a daily basis. The unit control identifier for a PCU, Fusing, Transfer belt is entered into the memory of the MMS system and the unit is incorporated into the production unit of the machine (Step 805).

The machine is then transferred to a first inspection station. The inspector at the inspection station inputs daily the inspection station identifier and his employee code (Step 806). The inspector then tests the production unit containing the PCU, Fusing, transfer belt for defects (Step 807). If no defects are detected, the inspector scans the PCU, Fusing, Transfer Belt's unit control Identifier into the memory of the MMS (Step 810) and production continues. If the inspector discovers a defect, the inspector inputs the defect information (step 808) and appropriate re-work and/or re-work information is entered into the MMS in a manner consistent with the disclosure herein. Collectively, the steps of inputting the inspection station identifier, testing for defects, inputting defect information, and re-working/inputting re-working information and scanning the unit control identifier when no detects are detected shall be termed INSPECTION. Thus, for example Steps 806–810, inclusive are termed INSPECTION of the PCU, Fusing, Transfer Belt.

The production unit is then transferred to a second production station for incorporation of the Developer/Tandem LCT. The unit control identifiers for the Developer/Tandem LCT's ready for incorporation into production units are set in Step 811. The production station identifier for the production station responsible for incorporating the Developer/Tandem LCT is manually input into the memory of the MMS System by an employee working at the production station on a daily basis (Step 812). The unit control identifier for a Developer/Tandem LCT is entered into the memory of the MMS system and the unit is incorporated into the production unit of the machine (Step 813). The production unit is then transferred to a second inspection station, and INSPECTION of the Scanner/Duplex then takes place (Step 814).

The production unit is then transferred to a third production station for incorporation of the Scanner/Duplex. The unit control identifiers for the Scanner/Duplex LCT's ready for incorporation into production units are set in Step 815. The production station identifier for the production station responsible for incorporating the Scanner/Duplex is manually input into the memory of the MMS System by an employee working at the production station on a daily basis (Step 816). The unit control identifier for Scanner/Duplex is entered into the memory of the MMS system and the unit is incorporated into the production unit of the machine (Step 817). The BICU PCB Serial Number is then scanned into the MMS System in Step 818. The production unit is then transferred to a third inspection station, and INSPECTION of the Scanner/Duplex then takes place (Step 819).

The production unit is then transferred to a fourth inspection station. At this station, the Scanner units assigned bar code is scanned into the MMS computer memory (Step 820), the Scanning power supply, paper feed and I/O PCB serial number is scanned into the MMS computer memory (Step 821), the Scanning beam pitch/Beam power assigned bar code is scanned into the memory of the MMS System (822), Safety Information is input into the memory of the MMS System (Step 823) and INSPECTION of these systems is completed (Step 824)

The production unit is then transferred to a fifth inspection station. At this station, each of the components unit control identifiers is scanned in order to ensure that the unit control identifiers are properly matched to the machine identifier (Step 825) and INSPECTION of the assembled system is completed (Step 826). Finally, the unit is transferred to a sixth inspection station, a total counter number is read into the memory of the MMS System, along with the Machine Serial Number and the ARDF ("Automatic Reverse Document Feeder") Serial Number. Inspection of the assembled unit performed (Step 828) and production.

The invention has been described in terms of certain preferred and alternate embodiments which are representative and alternate embodiments which are representative of only some of the various ways in which the basic concepts of the invention may be implemented. Certain modification or variations on the implementation of the inventive concepts which may occur to those of ordinary skill in the art are within the scope of the invention and equivalents, as defined by the accompanying claims.

I claim:

1. A method of monitoring the manufacturing status of a machine comprising the steps of:

assigning a machine identifier to a machine comprised of one or more components, each one or more components to be incorporated into the machine at one or more production stations, wherein each one or more production stations is assigned a production station identifier;

inputting the machine identifier into at least one memory of a first computer;

inputting a unit control identifier for each one or more components wherein the unit control identifier is linked to the production station identifier where the unit control identifier is input;

inputting defect information for each one or more component into the memory at an inspecting station apart from any of the production stations, wherein each inspecting station is assigned an inspecting station identifier, so that the defect information and the unit control identifier are linked to the inspecting station where the defect information is input and wherein the defect information includes at least one defect phenomenon linking the stored unit control identifier and the stored machine identifier, wherein the defect information includes at least one of defect rates and rates without defect, wherein the defect rate information comprises a listing of each inspection station, a number of defects identified at each production station, a number of units inspected, a defect rate at each inspection station, a total number of defects, a failure rate, a category and number of each category of defect detected and an associated failure rate; and outputting defect information which includes at least one of the machine identifier and the unit control identifier, wherein the machine history in manufacturing is traced later inputting a business function identifier into the memory, wherein the business function identifier identifies the party responsible for resolving the at least one defect phenomena.

2. The method of claim 1, wherein the machine identifier and the unit control identifier are input by scanning bar codes assigned to the machine and the component.

3. The method of claim 1, further comprising the steps of inputting a resolving method for the at least one defect phenomena into the memory.

4. The method of claim 3, wherein the resolving method is selected from a list of pre-stored resolving methods.

5. The method of claim 3, wherein the selected resolving method is stored in the memory for later use.

6. The method of claim 3, further comprising the steps of:

inputting a new unit control identifier corresponding to a new component, wherein the new component replaces another component by implementation of said resolving method.

7. The method of claim 1, wherein said output is displayed on a second computer that is connected to the first computer through a network.

8. The method of claim 1, further comprising the step(s) of:

inputting the time when said defect phenomena occurred.

9. The method of claim 8, wherein said output is accessed in real time.

10. The method of claim 8, wherein the information in the memory can be retrieved by selecting at least one of the machine identifier, the unit control identifier, the production station identifier and the inspection station identifier.

11. The method of claim 8, wherein the information in said memory can be sorted by using at least one of the machine number, the unit control identifier, the production station identifier and the inspection station identifier.

12. The method of claim 1, wherein the output is printed out daily.

13. The method of claim 1, further comprising the step(s) of:

selecting designating stations among said responsible business functions to send message through said network to said selected responsible business functions.

14. The method of claim 13, further comprising the step of:

selecting at least one of said business functions to see messages that are sent from said selected stations.

15. The method of claim 1, wherein said outputting process comprises the steps of;

counting the number of times of said defect and the number of times of manufactured component;

calculating statistics which relate to said defect automatically; and outputting said calculated statistics.

16. The method of claim 1, further comprising the steps of:

inputting the at least one defect phenomena for each machine into the memory at a quality assurance station, wherein said quality assurance station has a quality assurance identifier, and wherein the quality assurance station is linked to the machine number.

17. The method of claim 1 further comprising the steps of:

inputting a second machine identifier into the memory, wherein the second machine identifier is assigned to each machine and is different from the first machine identifier;

counting an input quantity at a production station based on the stored first machine identifier and an output quantity from a second production station based on the stored second machine identifier; and generating a work-in-process number from at least the input quantity and the output quantity.

18. A method of tracing a machine history in manufacturing by using computers, wherein said machine includes plural components, comprising the steps of;

assigning each component a unit control identifier;

incorporating each component at a production station, wherein the production station is assigned a production station identifier;

inputting the unit control identifier into at least one memory of a second computer which is connected to the first computers through a network by using bar code at each of said production stations;

inspecting each component at an inspection station apart from any of the production stations before the assembled units are assembled as said machine;

inputting defect information into said memory at each inspecting station such that said inputted defect information includes at least one defect phenomenon and information identifying the inspection station, and said defect information is linked to said unit control identifier, wherein said inputted defect information in said memory is traced in real time by using said unit control number, wherein the defect information includes at least one of defect rates and rates without defect, wherein the defect rate information comprises a listing of each inspection station, a number of defects identified at each production station, a number of units inspected, a defect rate at each inspection station, a total number of defects, a failure rate, a category and number of each category of defect detected and an associated failure rate and, inputting a business function identifier into the memory, wherein the business function identifier identifies the party responsible for resolving the at least one defect phenomena.

19. The method of claim 18, further comprising the steps of:

inputting a production station identifier at each production station before each of the components is assembled, wherein said inputted defect information in memory is traced in real time by using said unit control identifier and the production station identifier.

20. The method of claim 18, further comprising the steps of:

assigning a machine identifier to each machine that is going to be manufactured at plural production stations;

inputting said machine identifier into at least one memories of said computer; and linking said machine identifier and said unit control identifier, wherein said inputted defect information in said memory is traced in real time by using said unit control identifier, said production station identifier and said machine identifier.

21. A method of claim 19, further comprising the steps of:

inspecting said machine after said units are assembled; and inputting the result of inspection, wherein said inputted inspection information in said memories is traced in real time by using said unit control number, and assembling station, said machine number.

* * * * *